(12) United States Patent
Jones

(10) Patent No.: US 12,045,848 B2
(45) Date of Patent: Jul. 23, 2024

(54) TALENT AND OPPORTUNITY MANAGEMENT

(71) Applicant: Vower Inc., Atlanta, GA (US)

(72) Inventor: Rejoice Marilyn Jones, Atlanta, GA (US)

(73) Assignee: Vower Inc., Atlanta, GA (US)

( * ) Notice: Subject to any disclaimer, the term of this patent is extended or adjusted under 35 U.S.C. 154(b) by 0 days.

(21) Appl. No.: 17/857,836

(22) Filed: Jul. 5, 2022

(65) Prior Publication Data

US 2024/0013247 A1    Jan. 11, 2024

(51) Int. Cl.
*G06Q 30/02* (2023.01)
*G06Q 30/0207* (2023.01)
*G06Q 30/0208* (2023.01)

(52) U.S. Cl.
CPC ..... *G06Q 30/0208* (2013.01); *G06Q 30/0224* (2013.01)

(58) Field of Classification Search
CPC ....... G06Q 30/0208; G06Q 30/0207–30/0277; G06Q 30/0224
See application file for complete search history.

(56) References Cited

U.S. PATENT DOCUMENTS

| | | | | |
|---|---|---|---|---|
| 10,832,219 B2* | 11/2020 | Jersin | ................ | G06F 16/90324 |
| 11,531,446 B1* | 12/2022 | Kakaire | ........... | G06Q 10/06398 |
| 11,544,308 B2* | 1/2023 | Meng | .................. | G06F 16/3346 |
| 11,636,520 B1* | 4/2023 | Olden | ................ | G06Q 30/0273 |
| | | | | 705/14.69 |
| 2006/0229896 A1* | 10/2006 | Rosen | ................ | G06Q 10/1053 |
| | | | | 705/321 |
| 2013/0124298 A1* | 5/2013 | Li | ...................... | G06Q 30/0241 |
| | | | | 705/14.42 |
| 2017/0046729 A1* | 2/2017 | Breslin | .............. | G06Q 30/0214 |
| 2018/0096444 A1* | 4/2018 | Bradley | ............. | G06Q 50/2057 |
| 2019/0197486 A1* | 6/2019 | Jersin | .................... | G06F 16/735 |
| 2020/0302368 A1* | 9/2020 | Mathiesen | ............... | G06N 5/02 |
| 2021/0012267 A1* | 1/2021 | Fawaz | .................... | G06N 5/025 |
| 2021/0383261 A1* | 12/2021 | Hanna | .................. | G06Q 10/105 |
| 2021/0383308 A1* | 12/2021 | Hanna | ............. | G06Q 10/06398 |
| 2022/0067665 A1* | 3/2022 | Westerheide | .......... | G06N 20/00 |
| 2022/0092547 A1* | 3/2022 | Garg | ........................ | G06N 3/045 |
| 2023/0088128 A1* | 3/2023 | Shugla | ................... | G06N 20/00 |
| | | | | 705/321 |
| 2023/0128945 A1* | 4/2023 | Khan | .................. | G06Q 20/381 |
| | | | | 705/14.39 |

(Continued)

*Primary Examiner* — Thuy N Nguyen
(74) *Attorney, Agent, or Firm* — Sterne, Kessler, Goldstein & Fox P.L.L.C.

(57) ABSTRACT

A user device may generate a user profile indicating a plurality of user elements. The user device may select a function of a plurality of functions. Based on a selection of the function, an interactive indication of a required element for the function that is missing from the plurality of user elements may be displayed. Instruction for adding the required element to the plurality of user elements may be received based on an interaction with the interactive indication of the required element. The user profile may be updated based on an indication that the required element is added to the plurality of user elements. Based on the updated user profile, a request to execute the function may be sent. For example, a request to execute the function may be sent to a device, an entity, and/or a system associated with and/or providing the function.

15 Claims, 9 Drawing Sheets

(56) References Cited

U.S. PATENT DOCUMENTS

2023/0131603 A1\* 4/2023 Quigley ............. G06Q 30/0185
705/65
2023/0237438 A1\* 7/2023 Whitehead ............... G06N 5/04
705/321

\* cited by examiner

FIG. 2B

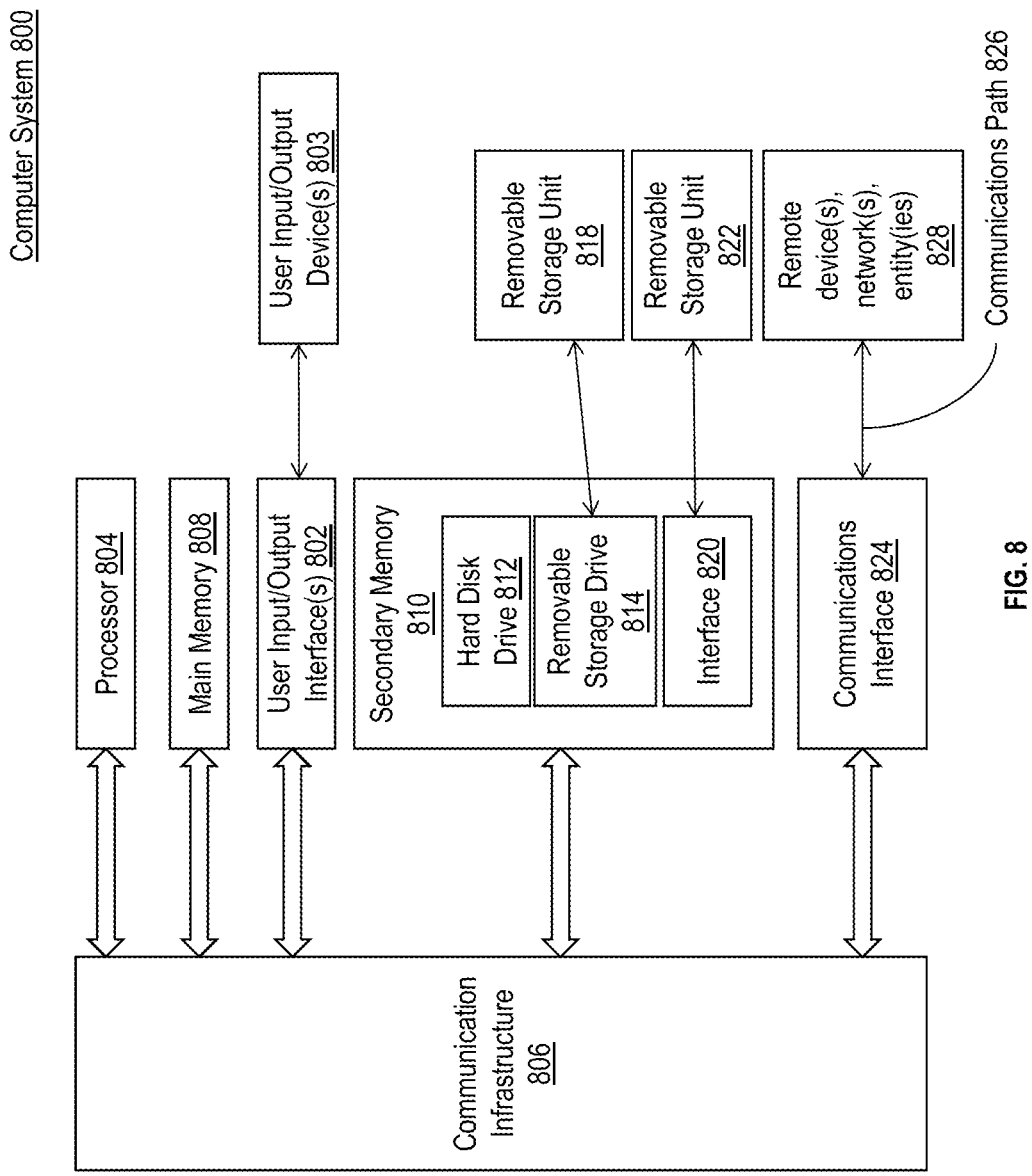

TALENT AND OPPORTUNITY MANAGEMENT

BACKGROUND

The talent and opportunity marketplace is evolving. Today, the U.S. labor force supports more non-traditional and/or remote working arrangements than it has in years past. Opportunity/job seekers routinely possess nuanced skill sets that may not be traditionally credentialed and/or obtained through accredited entities and/or institutions. Conventional talent and opportunity management services and/or systems, for example, such as job searching and posting applications, etc., are limited to either the supply side (e.g., supporting entities providing job/work and/or other experience opportunities, etc.) or the demand side (e.g., supporting individuals with traditional degrees, licenses, accreditations, and/or employment histories seeking job/work and/or other experience opportunities, etc.) of the talent and opportunity market. Entities providing non-traditional job/work and/or other experience opportunities, such as social media platform management roles, opportunities existing in digital/virtual environments, and/or curated roles for new and/or start-up businesses/companies are unable to identify and/or communicate with potential candidates. Individuals without traditional degrees, licenses, accreditations, and/or employment histories (and/or individuals with non-traditional degrees, licenses, accreditations, and/or employment histories), for example, such as social media influencers and/or the like, are unable to identify and/or acquire non-traditional job/work and/or other experience opportunities using traditional talent and opportunity management tools such as job boards, corporate listings, and/or the like.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2B shows an example of a user interface for talent and opportunity management, according to some aspects.

FIG. 8 shows a schematic block diagram of an example computer system in which aspects described may be implemented.

DETAILED DESCRIPTION

Figure 1:
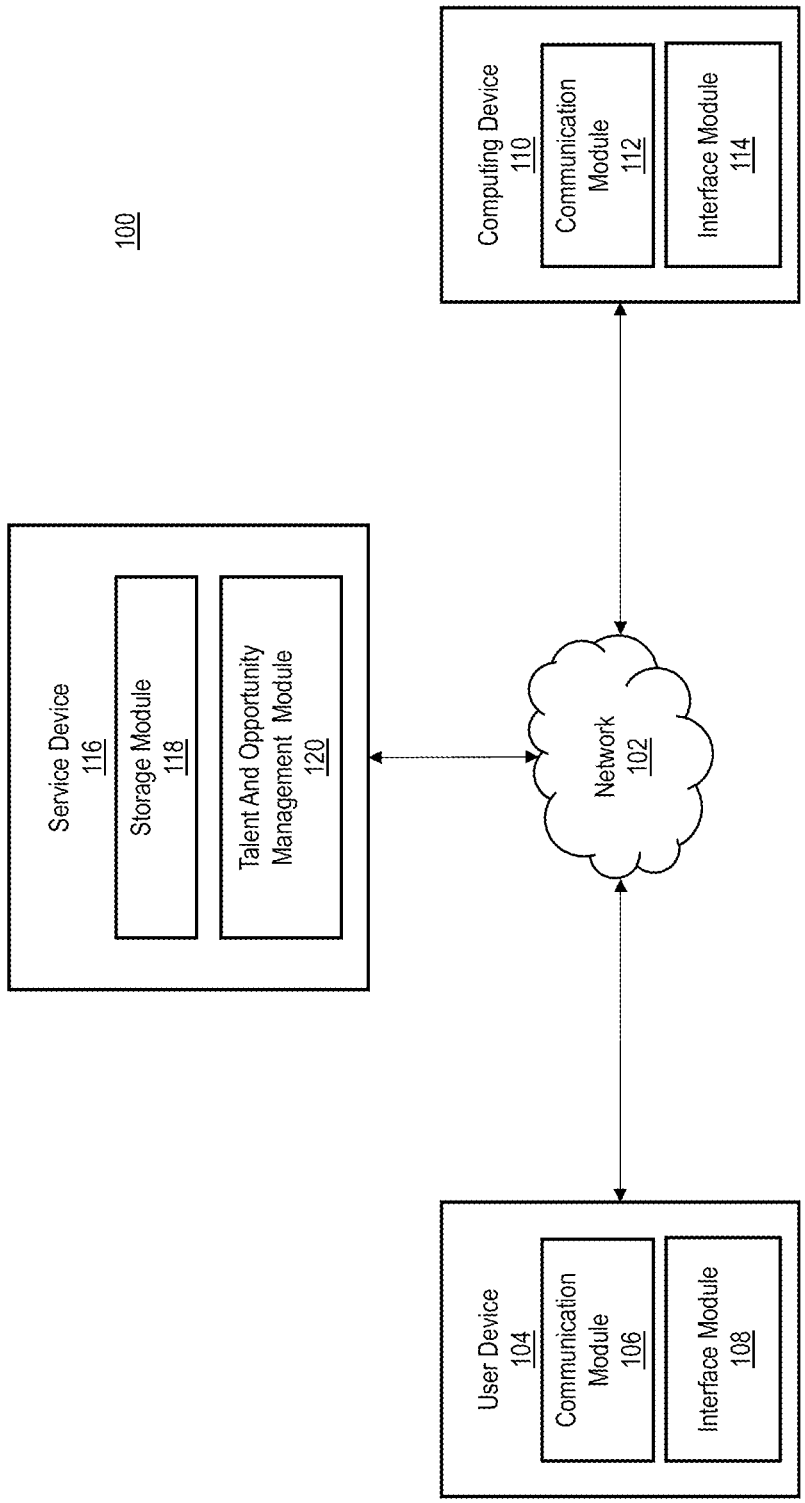
FIG. 1 shows an example system for talent and opportunity management, according to some aspects.

Provided herein are system, apparatus, device, method, computer program product embodiments, and/or combinations and sub-combinations thereof, for talent and opportunity management. According to some aspects, a user device (e.g., a smart device, a mobile device, a laptop, a tablet, a computing device, a display device, etc.) may be used, for example, by a user (e.g., an opportunity-seeking individual, etc.), to generate a user profile. According to some aspects, the user profile may indicate a plurality of user elements. For example, user elements may include, but are not limited to, examples of projects/work (e.g., digital art, artwork, applications/code, multimedia, etc.) performed by a user, social media information, and/or site profile information, employment history information associated with a user, general/personal information associated with a user, skill-related information associated with a user, and/or the like.

According to some aspects, the user device may generate, navigate to, and/or display an interface (e.g., a user interface, an online/interfaced system/network tool, etc.). For example, the interface may be associated with the user profile. According to some aspects, the interface may be associated with (e.g., an instance of, etc.) a talent and opportunity management application including various Application Programming Interface (API) elements and/or components. The interface may be used to select a function (e.g., a task, a job, an engagement, an experience, etc.) of a plurality of functions. Based on a selection of the function, an interactive indication of a required element (e.g., skill, experience, training, task completion, etc.) for the function that is missing from the plurality of user elements may be displayed. Instruction for adding the required element to the plurality of user elements may be received based on an interaction with the interactive indication of the required element. According to some aspects, based on an indication that the required element is added to the plurality of user elements, the user profile may be updated. According to some aspects, based on the updated user profile, a request to execute the function may be sent. For example, a request to execute the function may be sent to a device, an entity, and/or a system associated with and/or providing the function. According to some aspects, the user device may send data indicative of at least a portion of the user profile and the indication that the required element is added to the plurality of user elements to a computing device associated with the function. For example, a resume indicative of portions of the user profile and any skills that have been acquired through the system described herein may be sent to an entity associated with a function.

According to some aspects, a computing device (e.g., a smart device, a mobile device, a laptop, a tablet, a cloud-based device, etc.) may be used, for example, by an entity (e.g., an entity providing traditional and/or non-traditional job/work and/or other experience opportunities, etc.), to generate a function profile associated with a function (e.g., a task, a job, an engagement, an experience, etc.). According to some aspects, the function profile may be associated with a talent and opportunity management application including various API elements and/or components. A value package of a plurality of value packages may be mapped to the function profile, for example, based on the function. According to some aspects, a value (e.g., an amount of points, credits, tokens, etc.) of a value package may correspond to (e.g., be provided based on, etc.) a type of function. An indication of the function and at least a portion of the value of the value package may be displayed, for example, according to the function profile. For example, an entity may be allocated an amount of points, credits, tokens, and/or the like based on the type of function the entity post or provides via a function profile.

According to some aspects, a request to execute the function may be received based on displaying the function. For example, an entity may indicate via a user interface that a function such as building a website needs to be performed. An indication that completion of the function will award a user a certain amount of points, credits, tokens, and/or the like may be displayed with an indication of the function, and interested users may submit requests to complete the function. According to some aspects, the transfer of at least a portion of the value of the value package from the function profile to a user profile may be performed based on an indication that the function is executed, for example, by a user of the user profile. According to some aspects, portions of the user profile and/or data indicative of the user profile may be displayed to user devices (user devices associated with opportunity-seeking individuals, etc.) with indications of any value of the value package from the function profile that has been transferred to the user profile.

The system, apparatus, device, method, computer program product embodiments, and/or combinations and sub-combinations thereof, for talent and opportunity management, described herein use artificial intelligence (AI) to gamify workforce development to cultivate online and/or digital upskilling for users via an interactive user interface. According to some aspects, a trained machine learning model (and/or AI engine) facilitates and/or enables unique pairings between user devices (and/or users of user devices) and computing devices (and/or users of computing devices), for example, based on user profiles and provided functions, respectively. According to some aspects, unique pairings between user devices (and/or users of user devices) and computing devices (and/or users of computing devices) enable and/or facilitate entities providing functions including non-traditional job/work and/or other experience opportunities, such as social media platform management roles, opportunities existing in digital/virtual environments, and/or curated roles for new and/or start-up business/companies to identify and/or communicate with potential candidates. According to some aspects, unique pairings between user devices (and/or users of user devices) and computing devices (and/or users of computing devices) enable (and/or facilitate) users, including but not limited to individuals without traditional degrees, licenses, accreditations, and/or employment histories (and/or individuals with non-traditional degrees, licenses, accreditations, and/or employment histories), to acquire non-traditional job/work and/or any other workforce/experience opportunities.

These and other technological advantages are described herein.

FIG. 1 shows an example system 100 for talent and opportunity management. The system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

The system 100 may include a network 102. The network 102 may include a packet-switched network (e.g., internet protocol-based network), a non-packet switched network (e.g., quadrature amplitude modulation-based network), and/or the like. The network 102 may include network adapters, switches, routers, modems, and the like connected through wireless links (e.g., radiofrequency, satellite) and/or physical links (e.g., fiber optic cable, coaxial cable, Ethernet cable, or a combination thereof). The network 102 may include public networks, private networks, wide area networks (e.g., Internet), local area networks, and/or the like. The network 102 may include a content access network, content distribution network, and/or the like. The network 102 may provide and/or support communication from telephone, cellular, modem, and/or other electronic devices to and throughout the system 100. For example, the system 100 may include a user device 104 in communication with a computing device 110, and a service device 116 via the network 102.

According to some aspects, the user device 104 may include, for example, a smart device, a mobile device, a laptop, a tablet, a display device, a computing device, or any other device capable of communicating with the computing device 110, the service device 116, and/or any other device/component of the system 100. The user device 104 may include a communication module 106 that facilitates and/or enables communication with the network 102 (e.g., devices, components, and/or systems of the network 102, etc.), the computing device 110, the service device 116, and/or any other device/component of the system 100. For example, the communication module 106 may include hardware and/or software to facilitate communication. The communication module 106 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 106 may include any hardware and/or software necessary to facilitate communication.

According to some aspects, the user device 104 may include an interface module 108. According to some aspects, the interface module 108 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, request, and/or navigate a user interface generated and/or displayed by the interface module 108. According to some aspects, interaction with the input devices and/or components may enable a user to manipulate and/or interact with components of a user interface, for example, a talent and opportunity management application configured with, and/or accessible by the user device 104 and/or the like.

According to some aspects, the interface module 108 enables a user to interact with the user device 104, the network 102, the computing device 110, the service device 116, and/or any other device/component of the system 100. The interface module 108 may include any interface for presenting and/or receiving information to/from a user, for example, such as a talent and opportunity management interface, application, webpage, and/or the like.

According to some aspects, the interface module 108 may include a web browser (e.g., Internet Explorer®, Mozilla Firefox®, Google Chrome®, Safari®, or the like). According to some aspects, the interface module 108 may include a multimedia/interactive (e.g., Youtube®, Canva 101, Mailchimp 101, et.) interface. The interface module 108 may request/query and/or send/provide various files from a local source and/or a remote source, such as the computing device 110, the service device 1116, and/or the like. The interface module 108 may access, process, and view information, web pages, and/or applications available to it from the system 100 via the network 102. According to some aspects, the interface module 108 enables a user to view web application documentation and/or content, application pages, webpages, and/or any other interface. For example, the interface module 108 may be used to access and/or view a talent and opportunity management application configured with, and/or accessible by the user device 104.

According to some aspects, the user device 104 may communicate data/information to the service device 116, for example, via a talent and opportunity management application and/or the like, that may be used to generate a user profile. For example, the user device 104 may communicate to the service device 116 data/information associated with a user of the user device 104 that may be used to generate a user profile. According to some aspects, a user profile may indicate a plurality of user elements. User elements may include, but are not limited to, biographical information associated with a user, examples of projects/work (e.g., digital art, artwork, applications/code, multimedia, etc.) performed by a user, social media information and/or site profile information, employment history information associated with a user, general/personal information associated with a user, skill-related information associated with a user, and/or the like. The user profile may be stored and/or managed by the service device 116. For example, the service device 116 may include storage module 118 that stores user profiles and/or user elements associated with user profiles.

According to some aspects, the computing device 110 may include, for example, a smart device, a mobile device, a laptop, a tablet, a display device, a computing device, or any other device capable of communicating with the user device 104, the service device 116, and/or any other device/component of the system 100. The computing device 110 may include a communication module 112 that facilitates and/or enables communication with the network 102 (e.g., devices, components, and/or systems of the network 102, etc.), the user device 104, the service device 116, and/or any other device/component of the system 100. For example, the communication module 112 may include hardware and/or software to facilitate communication. The communication module 112 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 112 may include any hardware and/or software necessary to facilitate communication.

According to some aspects, the computing device 110 may include an interface module 114. According to some aspects, the interface module 108 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, request, and/or navigate a user interface generated and/or displayed by the interface module 114. According to some aspects, interaction with the input devices and/or components may enable a user to manipulate and/or interact with components of a user interface, for example, such as a talent and opportunity management application configured with, and/or accessible by the computing device 110 and/or the like.

According to some aspects, the interface module 114 enables a user to interact with the computing device 110, the network 102, the user device 104, the service device 116, and/or any other device/component of the system 100. The interface module 114 may include an interface that generates, supports, and/or facilitates the exchange and/or interaction of data indicative of user profiles and/or user elements including, but not limited to sharable resumes and/or other user-based information. The interface module 114 may include any interface for presenting and/or receiving information to/from a user, for example, such as a talent and opportunity management interface, application, webpage, and/or the like.

According to some aspects, the interface module 108 may include a web browser (e.g., Internet Explorer®, Mozilla Firefox®, Google Chrome®, Safari®, or the like). The interface module 114 may request/query and/or send/provide various files from a local source and/or a remote source, such as the user device 104, the service device 1116, and/or the like. The interface module 108 may access, process, and view information, web pages, and/or applications available to it from the system 100 via the network 102. According to some aspects, the interface module 114 enables a user to view web application documentation and/or content, application pages, webpages, and/or any other interface. For example, the interface module 114 may be used to access and/or view a talent and opportunity management application configured with, and/or accessible by the computing device 110.

According to some aspects, the computing device 110 may communicate data/information to the service device 116, for example, via a talent and opportunity management application and/or the like, that may be used to generate a function profile. For example, the computing device 110 may communicate to the service device 116 data/information associated with various functions (e.g., tasks, jobs, engagements, experiences, etc.) that may be associated with and/or provided by a user, entity, organization, and/or the like associated with the computing device 110. The function profile may be stored and/or managed by the service device 116. For example, the storage module 118 may store function profiles and/or any other data/information associated with an entity, an organization, a business, and/or the like.

For example, the computing device 110 may be used to access a talent and opportunity management application and/or the like, and a user associated with an entity, an organization, a business, an opportunity, and/or the like may complete a registration and verification process. The registration and verification process may include, for example, the computing device 110 providing the service device 116 identifying information. According to some aspects, the service device 116 may store (e.g., via the storage module 118, etc.) data/information (e.g., whitelist/blacklist data, public data, social media information, etc.) used to verify the computing device 110 and/or a user of the computing device 110.

According to some aspects, the service device 116 may communicate with one or more third-party devices (not shown) to verify the computing device 110 and/or a user of the computing device 110. For example, third-party devices may be associated with banking/financial systems, credit bureaus, public/private information management devices and/or databases, and/or any other data verification service/device. The service device 116 may use any method to verify the computing device 110 and/or a user of the computing device 110.

According to some aspects, responsive to verification of the computing device 110 and/or a user of the computing device 110, a function profile may be generated and/or associated with the computing device 110 and/or a user of the computing device 110.

A value package of a plurality of value packages may be mapped to the function profile. For example, one or more value packages may be associated with a function indicated by a function profile. For example, the computing device 110 may send a request (e.g., for a user of the computing device 110, etc.) to acquire a value package. According to some aspects, acquiring a value package may require an exchange of funds and/or the like. For example, points may be purchased and allocated to a function indicated in a function profile.

According to some aspects, a value (e.g., an amount of points, credits, tokens, etc.) of a value package may correspond to (e.g., be provided based on, etc.) a function. For example, a value of a value package may be provided to the user device 104 (e.g., a user of the user device 104, a user profile, etc.) based on an execution of a function. According to some aspects, indications of functions and associated value packages may be displayed, for example, via a talent and opportunity management application. According to some aspects, one or more functions indicated, for example, via a talent and opportunity management application, may be associated with one or more function execution requirements. Function execution requirements may be any required element for the function. A required element may include any user and/or user device identifier, credential, configuration, skill, attribute, quality, qualifier, and/or the like that must be presented and/or possessed by a user device and/or a user of the user device to execute a function. For example, a function such as an opportunity to generate a website and/or the like may include website building history information and/or website building demonstration material/skills as a required element to execute the function.

According to some aspects, as previously described, the user device 104 may generate, navigate to, and/or display a user interface (e.g., via the interface module 108, etc.). For example, one or more portions of the user interface may be associated with the user profile. According to some aspects, the interface may further be associated with (e.g., an instance of, etc.) a talent and opportunity management application.

Figure 2A:
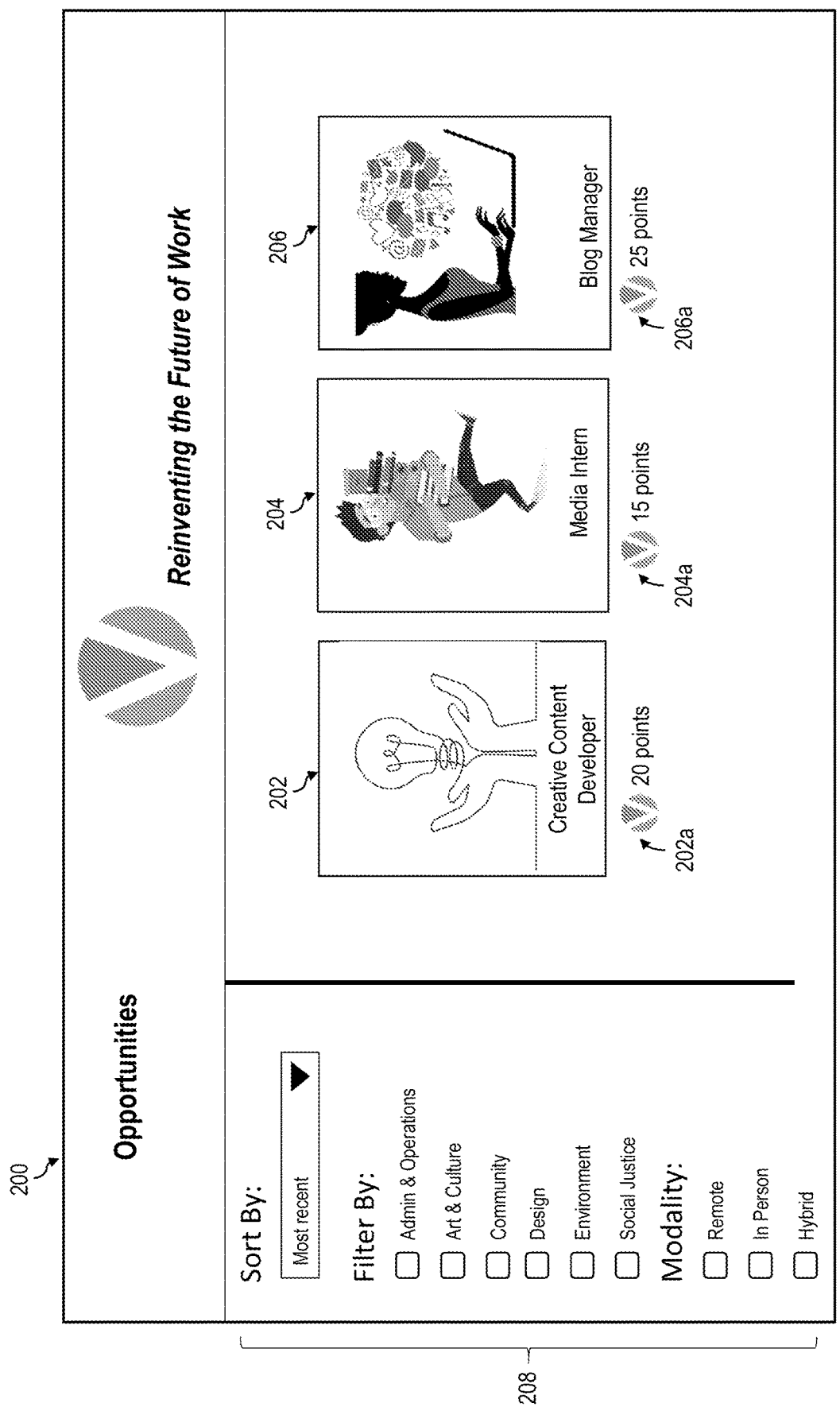
FIG. 2A shows an example of a user interface for talent and opportunity management, according to some aspects.

FIG. 2A shows an example user interface for talent and opportunity management. User interface 200 may include function indicators 202, 204, and 206. According to some aspects, the function indicators 202, 204, and 206 may indicate functions associated with the computing device 110 and/or a user of the computing device 110. According to some aspects, the function indicators 202, 204, and 206 may be associated with value indicators 202*a*, 204*a*, and 206*a*, respectively. The value indicators 202*a*, 204*a*, and 206*a* may indicate at least a portion of a value package that has been allocated to the functions indicated by the function indicators 202, 204, and 206. Execution of a function indicated by a function indicator (e.g., function indicators 202, 204, and 206, etc.) may cause the value indicated by the value indicator (e.g., value indicator 202*a*, 204*a*, and 206*a*, etc.) to be transferred to a user profile, for example, a user profile associated with a user and/or user device (e.g., the user device 104, etc.) associated with executing the function.

According to some aspects, the function indicators 202, 204, and 206 may be displayed responsive to function filtering information received via filter elements 208. The filter elements may be used to identify functions based on user-defined criteria including, but not limited to, a function type, a function attribute, a modality associated with function execution, and/or the like.

According to some aspects, the function indicators 202, 204, and 206 may be interactive. For example, an interaction with a function indicator (via one or more input devices and/or components, etc.) may select the associated function. Based on a selection of a function indicator (e.g., function indicators 202, 204, and 206, etc.) a request may be sent to a computing device (e.g., the computing device 106, etc.) associated with the selected function and/or a function profile associated with the selected function to execute the selected function.

Figure 2B:
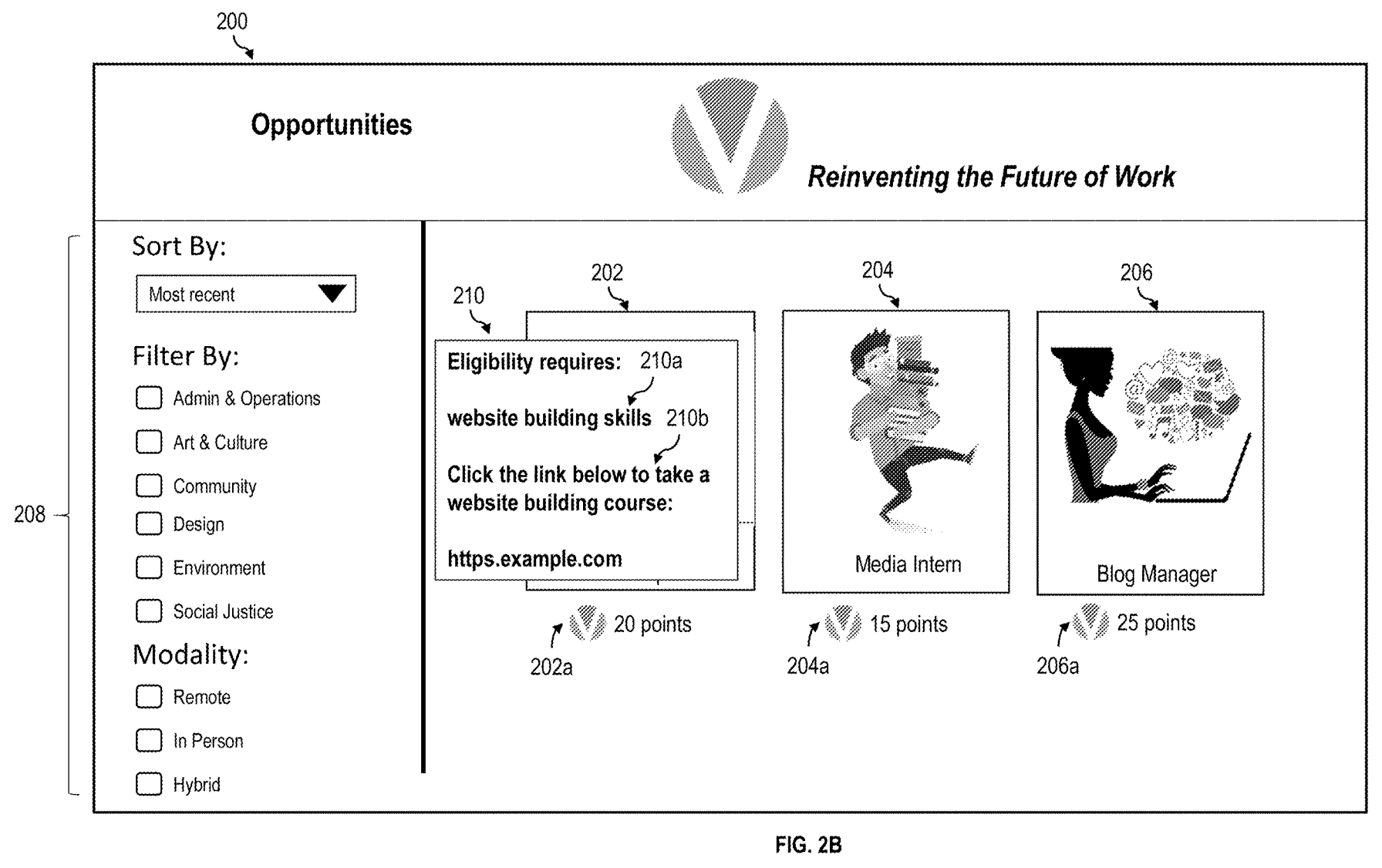

According to some aspects, a selection of a function via interaction with a function indicator causes an interactive indication of a required element (e.g., skill, experience, training, task completion, etc.) for the function to be displayed. FIG. 2B shows an example of the user interface 200, where function indicator 202 has been selected and an interactive window 210 is displayed. The interactive window 210 may indicate a required element 210*a* (e.g., website building skills) for the function indicated by the function indicator 202. The interactive window 210 may indicate an instruction 210*b* for adding the required element to a user profile. For example, based on an indication that the website building course has been completed as instructed by instruction 210*b*, the required element 210*a* may be added to a user profile (e.g., the user profile may be updated, etc.). Based on the required element 210*a* being added to the profile, the user device 104 and/or a user of the user device 104 may execute the function indicated by the function indicator 202.

Returning to FIG. 1, according to some aspects, the service device 116 may determine which functions are displayed via a user interface operating on the user device 104 and/or recommended to a user of the user device 104. For example, the service device 116 may include a talent and opportunity management module 120. The talent and opportunity management module 120 may cause functions to be displayed to a user of the user device 104, for example via a user interface (e.g., a talent and opportunity management application, etc.). Functions displayed via a user interface may be based on aspects of a user profile, for example, such as user elements associated with the user profile. Functions displayed via a user interface may be based on a type of entity, organization, business, opportunity, and/or the like associated with the functions. For example, according to some aspects, the talent and opportunity management module 120 may include a trained machine learning model (and/or AI engine) that facilitates and/or enables unique pairings between user devices (and/or users of user devices) and computing devices (and/or users of computing devices) such as the user device 104 and the computing device 110.

According to some aspects, unique pairings between user devices (and/or users of user devices) and computing devices (and/or users of computing devices) enable and/or facilitate entities providing functions including non-traditional job/work and/or other experience opportunities, such as social media platform management roles, opportunities existing in digital/virtual environments, and/or curated roles for new and/or start-up business/companies to identify and/or communicate with potential candidates. According to some aspects, unique pairings between user devices (and/or users of user devices) and computing devices (and/or users of computing devices) enable (and/or facilitate) users, including but not limited to individuals without traditional degrees, licenses, accreditations, and/or employment histories (and/or individuals with non-traditional degrees, licenses, accreditations, and/or employment histories), to acquire non-traditional job/work and/or other experience opportunities.

Figure 3:
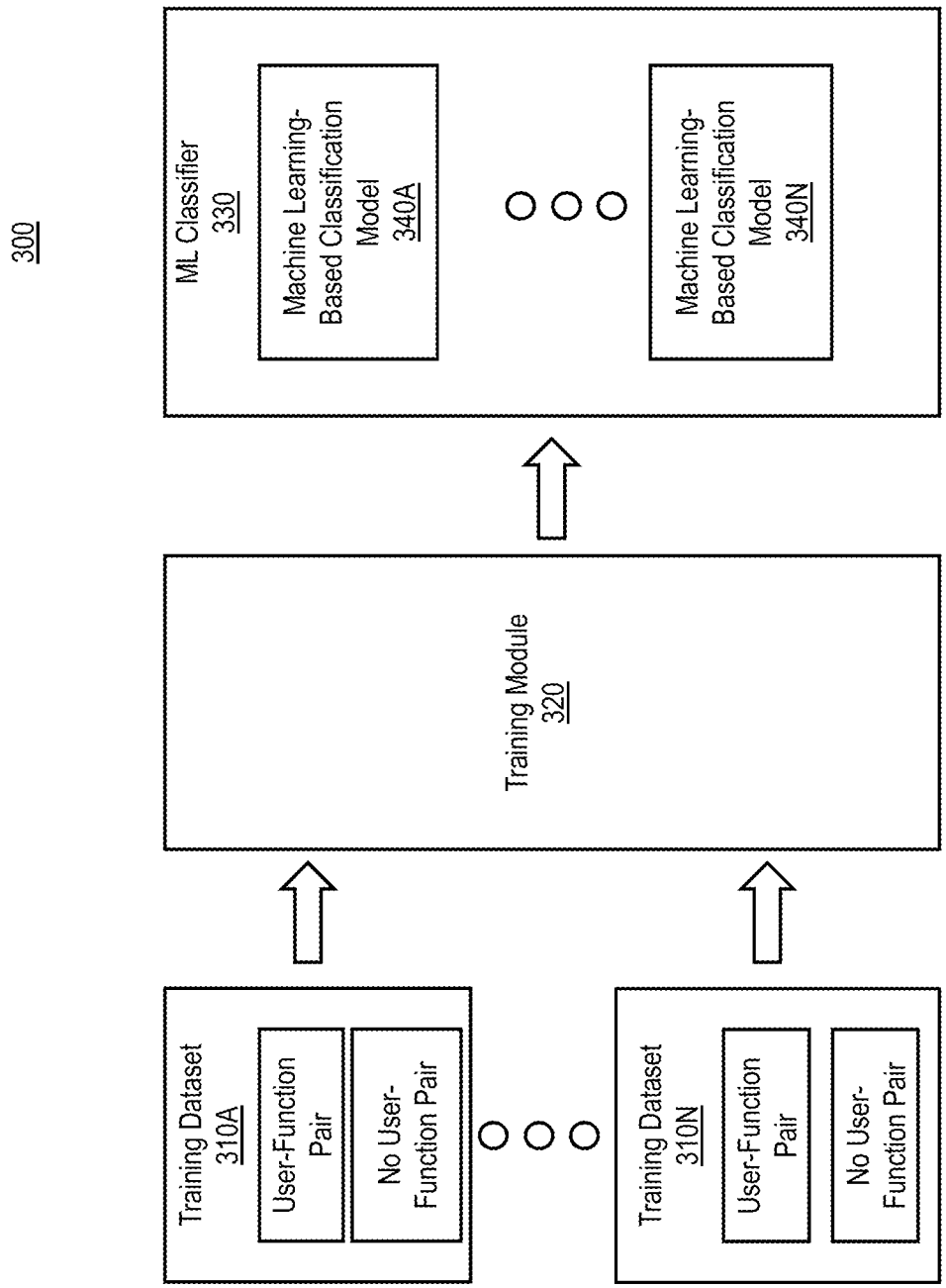
FIG. 3 shows an example system for training a machine learning module that may be used for talent and opportunity management, according to some embodiments.

FIG. 3 is an example system 300 for training talent and opportunity management module 120 to determine unique pairings between user devices and computing devices, recommend functions to users and/or user devices, identify potential users and/or user devices to execute functions based on a likelihood that the user and/or user devices would successfully execute the functions, and/or any other relationship between users of a talent and opportunity management application. FIG. 3 is described with reference to FIG. 1.

The system 300 may use machine learning (and/or AI) techniques to train at least one machine learning-based classifier 330 (e.g., a software model, neural network classification layer, etc.). The machine learning-based classifier 330 may be trained by the talent and opportunity management module 120 based on an analysis of one or more training datasets 310A-310N. The machine learning-based classifier 330 may be configured to classify features extracted from one or more datasets, for example, such as datasets indicative of data/information received from the user device 104 and/or the computing device 110 of FIG. 1. The machine learning-based classifier 330 may classify features extracted from datasets indicative of data/information received from the user device 104 and/or the computing device 110, and determine information about users of the user device 104 and/or the computing device 110, such as historical educational and/or experience information, social media/network information, community and/or public opinion information, political interest information, social interest information, and/or the like.

The one or more training datasets 310A-310N may comprise labeled baseline data such as labeled social and/or employment scenarios, labeled demographic information, and/or the like. The labeled baseline data may include any number of feature sets. Feature sets may include, but are not limited to, labeled data that identifies extracted features from data received from user devices (e.g., the user device 104, etc.), computing devices (e.g., the computing device 110, etc.), third-party sources, and/or the like.

The labeled baseline data may be stored in one or more databases. Data for talent and opportunity management operations may be randomly assigned to a training dataset or a testing dataset. According to some aspects, the assignment of data to a training dataset or a testing dataset may not be completely random. In this case, one or more criteria may be used during the assignment, such as ensuring that similar user-to-function pairings, similar function types, similar depicted talent and opportunity scenarios, similar demographic characteristic pairings, dissimilar user-to-function pairings, dissimilar function types, dissimilar talent and opportunity scenarios, dissimilar demographic characteristic pairings, and/or the like may be used in each of the training and testing datasets. In general, any suitable method may be used to assign the data to the training or testing datasets.

The talent and opportunity management module 120 may train the machine learning-based classifier 330 by extracting a feature set from the labeled baseline data according to one or more feature selection techniques. According to some aspects, the talent and opportunity management module 120 may further define the feature set obtained from the labeled baseline data by applying one or more feature selection techniques to the labeled baseline data in the one or more training datasets 310A-310N. The talent and opportunity management module 120 may extract a feature set from the training datasets 310A-310N in a variety of ways. The talent and opportunity management module 120 may perform feature extraction multiple times, each time using a different feature-extraction technique. In some instances, the feature sets generated using the different techniques may each be used to generate different machine learning-based classification models 340. According to some aspects, the feature set with the highest quality metrics may be selected for use in training. The talent and opportunity management module 120 may use the feature set(s) to build one or more machine learning-based classification models 340A-340N that are configured to determine and/or predict user-to-function pairings, similar function types, similar depicted talent and opportunity scenarios, similar demographic characteristic pairings, and/or the like.

According to some aspects, the training datasets 310A-310N and/or the labeled baseline data may be analyzed to determine any dependencies, associations, and/or correlations between user-to-function pairings, similar function types, similar depicted talent and opportunity scenarios, similar demographic characteristic pairings, and/or the like in the training datasets 310A-310N and/or the labeled baseline data. The term "feature," as used herein, may refer to any characteristic of an item of data that may be used to determine whether the item of data falls within one or more specific categories. For example, the features described herein may comprise user-to-function pairings, similar function types, similar depicted talent and opportunity scenarios, similar demographic characteristic pairings, and/or any other characteristics.

According to some aspects, a feature selection technique may comprise one or more feature selection rules. The one or more feature selection rules may comprise determining which features in the labeled baseline data appear over a threshold number of times in the labeled baseline data and identifying those features that satisfy the threshold as candidate features. For example, any features that appear greater than or equal to 2 times in the labeled baseline data may be considered candidate features. Any features appearing less than 2 times may be excluded from consideration as a feature. According to some aspects, a single feature selection rule may be applied to select features or multiple feature selection rules may be applied to select features. According to some aspects, the feature selection rules may be applied in a cascading fashion, with the feature selection rules being applied in a specific order and applied to the results of the previous rule. For example, the feature selection rule may be applied to the labeled baseline data to generate information (e.g., an indication of user-to-function pairings, similar function types, similar depicted talent and opportunity scenarios, similar demographic characteristic pairings, and/or the like, etc.) that may be used for talent and opportunity management. A final list of candidate features may be analyzed according to additional features.

According to some aspects, the talent and opportunity management module 120 may generate information (e.g., an indication of user-to-function pairings, similar function types, similar depicted talent and opportunity scenarios, similar demographic characteristic pairings, and/or the like, etc.) that may be used for talent and opportunity management may be based a wrapper method. A wrapper method may be configured to use a subset of features and train the machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. According to some aspects, forward feature selection may be used to identify one or more candidate user-to-function pairings, similar function types, similar depicted talent and opportunity scenarios, similar demographic characteristic pairings, and/or the like. Forward feature selection is an iterative method that begins with no feature in the machine learning model. In each iteration, the feature which best improves the model is added until the addition of a new variable does not improve the performance of the machine learning model. According to some aspects, backward elimination may be used to identify one or more candidate user-to-function pairings, similar function types, similar depicted talent and opportunity scenarios, similar demographic characteristic pairings, and/or the like. Backward elimination is an iterative method that begins with all features in the machine learning model. In each iteration, the least significant feature is removed until no improvement is observed on the removal of features. According to some aspects, recursive feature elimination may be used to identify one or more candidate user-to-function pairings, similar function types, similar depicted talent and opportunity scenarios, similar demographic characteristic pairings, and/or the like. Recursive feature elimination is a greedy optimization algorithm that aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

According to some aspects, one or more candidate user-to-function pairings, similar function types, similar depicted talent and opportunity scenarios, similar demographic characteristic pairings, and/or the like may be determined according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to an absolute value of the magnitude of coefficients and ridge regression performs L2 regularization which adds a penalty equivalent to the square of the magnitude of coefficients.

After the talent and opportunity management module 120 generates a feature set(s), the talent and opportunity management module 120 may generate a machine learning-based predictive model 240 based on the feature set(s). A machine learning-based predictive model may refer to a complex mathematical model for data classification that is generated using machine-learning techniques. For example, this machine learning-based classifier may include a map of support vectors that represent boundary features. By way of example, boundary features may be selected from, and/or represent the highest-ranked features in, a feature set.

According to some aspects, the talent and opportunity management module 120 may use the feature sets extracted from the training datasets 310A-310N and/or the labeled baseline data to build a machine learning-based classification model 340A-340N to determine and/or predict user-to-function pairings, similar function types, similar depicted talent and opportunity scenarios, similar demographic characteristic pairings, and/or the like. According to some aspects, the machine learning-based classification models 340A-340N may be combined into a single machine learning-based classification model 340. Similarly, the machine learning-based classifier 330 may represent a single classifier containing a single or a plurality of machine learning-based classification models 340 and/or multiple classifiers containing a single or a plurality of machine learning-based classification models 340. According to some aspects, the machine learning-based classifier 330 may also include each of the training datasets 310A-310N and/or each feature set extracted from the training datasets 310A-310N and/or extracted from the labeled baseline data. Although shown separately, talent and opportunity management module 120 may include the machine learning-based classifier 330.

The extracted features from datasets may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 330 may comprise a decision rule or a mapping that uses data from user devices, computing devices, a talent and opportunity management application, and/or the like to determine and/or predict user-to-function pairings, similar function types, similar depicted talent and opportunity scenarios, similar demographic characteristic pairings, and/or the like.

The data from user devices, computing devices, talent and opportunity management applications, and/or the like and the machine learning-based classifier 330 may be used to determine and/or predict user-to-function pairings, similar function types, similar depicted talent and opportunity scenarios, similar demographic characteristic pairings, and/or the like for the test samples in the test dataset. For example, the result for each test sample may include a confidence level that corresponds to a likelihood or a probability that the corresponding test sample accurately determines and/or predicts user-to-function pairings, similar function types, similar depicted talent and opportunity scenarios, similar demographic characteristic pairings, and/or the like. The confidence level may be a value between zero and one that represents a likelihood that the determined/predicted user-to-function pairings, similar function types, similar depicted talent and opportunity scenarios, similar demographic characteristic pairings, and/or the like are consistent with computed values. Multiple confidence levels may be provided for each test sample and each candidate (approximated) user-to-function pairings, similar function types, similar depicted talent and opportunity scenarios, similar demographic characteristic pairings, and/or the like. A top-performing candidate user-to-function pairings, similar function types, similar depicted talent and opportunity scenarios, similar demographic characteristic pairings, and/or the like may be determined by comparing the result obtained for each test sample with a computed user-to-function pairing, similar function types, similar depicted talent and opportunity scenarios, similar demographic characteristic pairings, and/or the like for each test sample. In general, the top-performing candidate user-to-function pairings, similar function types, similar depicted talent and opportunity scenarios, similar demographic characteristic pairings, and/or the like will have results that closely match the computed user-to-function pairings, similar function types, similar depicted talent and opportunity scenarios, similar demographic characteristic pairings, and/or the like. The top-performing candidate user-to-function pairings, similar function types, similar depicted talent and opportunity scenarios, similar demographic characteristic pairings, and/or the like may be used for talent and opportunity management operations.

Figure 4:
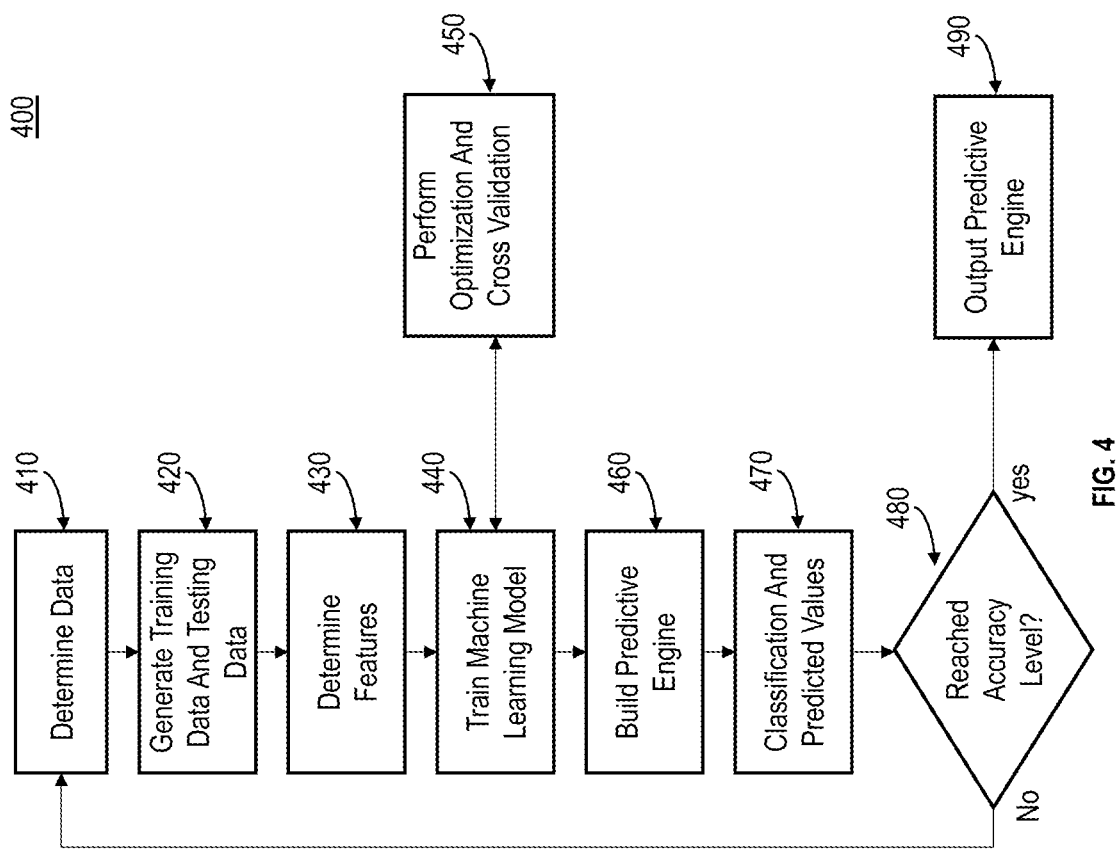
FIG. 4 shows a flowchart of an example training method for generating a machine learning classifier for talent and opportunity management, according to some embodiments.

FIG. 4 is a flowchart illustrating an example training method 400. According to some aspects of this disclosure, method 400 configures machine learning classifier 330 for classification through a training process using the talent and opportunity management module 120. The talent and opportunity management module 120 can implement supervised, unsupervised, and/or semi-supervised (e.g., reinforcement-based) machine learning-based classification models 340. The method 400 shown in FIG. 4 is an example of a supervised learning method; variations of this example of training method are discussed below, however, other training methods can be analogously implemented to train unsupervised and/or semi-supervised machine learning (predictive) models. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to the aspects of those figures.

In 410, the talent and opportunity management module 120 determines data from user devices, computing devices, a talent and opportunity management application, and/or the like. Data from user devices, computing devices, a talent and opportunity management application, and/or the like may be used to generate one or more datasets, each dataset associated with user-to-function pairings, similar function types, similar depicted talent and opportunity scenarios, similar demographic characteristic pairings, and/or the like.

In 420, talent and opportunity management module 120 generates a training dataset and a testing dataset. According to some aspects, the training dataset and the testing dataset may be generated by indicating user-to-function pairings, similar function types, similar depicted talent and opportunity scenarios, similar demographic characteristic pairings, and/or the like. According to some aspects, the training dataset and the testing dataset may be generated by randomly assigning user-to-function pairings, similar function types, similar depicted talent and opportunity scenarios, similar demographic characteristic pairings, and/or the like to either the training dataset or the testing dataset. According to some aspects, the assignment of data from user devices, computing devices, a talent and opportunity management application, and/or the like as training or test samples may not be completely random. According to some aspects, only the labeled baseline data for a specific feature extracted from specific data from user devices, computing devices, a talent and opportunity management application, and/or the like may be used to generate the training dataset and the testing dataset. According to some aspects, a majority of the labeled baseline data extracted from data from user devices, computing devices, talent and opportunity management applications, and/or the like may be used to generate the training dataset. For example, 75% of the labeled baseline data for determining user-to-function pairings, similar function types, similar depicted talent and opportunity scenarios, similar demographic characteristic pairings, and/or the like extracted from the data from user devices, computing devices, a talent and opportunity management application, and/or the like may be used to generate the training dataset and 25% may be used to generate the testing dataset. Any method or technique may be used to create the training and testing datasets.

In 430, talent and opportunity management module 120 determines (e.g., extract, select, etc.) one or more features that can be used by, for example, a classifier (e.g., a software model, a classification layer of a neural network, etc.) to label features extracted from a variety of data from user devices, computing devices, talent and opportunity management application, and/or the like. One or more features may comprise indications of determining user-to-function pairings, similar function types, similar depicted talent and opportunity scenarios, similar demographic characteristic pairings, and/or the like. According to some aspects, the talent and opportunity management module 120 may determine a set of training baseline features from the training dataset. Features of data from user devices, computing devices, a talent and opportunity management application, and/or the like may be determined by any method.

In 440, talent and opportunity management module 120 trains one or more machine learning models, for example, using the one or more features. According to some aspects, the machine learning models may be trained using supervised learning. According to some aspects, other machine learning techniques may be employed, including unsupervised learning and semi-supervised. The machine learning models trained in 340 may be selected based on different criteria (e.g., how close a predicted user-to-function pairing, function type, depicted talent and opportunity scenario, demographic characteristic pairing, and/or the like is to an actual user-to-function pairing, function type, depicted talent and opportunity scenario, demographic characteristic pairing, and/or the like, etc.) and/or data available in the training dataset. For example, machine learning classifiers can suffer from different degrees of bias. According to some aspects, more than one machine learning model can be trained.

In 450, talent and opportunity management module 120 optimizes, improves, and/or cross-validates trained machine learning models. For example, data for training datasets and/or testing datasets may be updated and/or revised to include more labeled data indicating different user-to-function pairings, similar function types, similar depicted talent and opportunity scenarios, similar demographic characteristic pairings, and/or the like.

In 460, talent and opportunity management module 120 selects one or more machine learning models to build a predictive model (e.g., a machine learning classifier, a predictive engine, etc.). The predictive model may be evaluated using the testing dataset.

In 470, talent and opportunity management module 120 executes the predictive model to analyze the testing dataset and generate classification values and/or predicted values.

In 480, talent and opportunity management module 120 evaluates classification values and/or predicted values output by the predictive model to determine whether such values have achieved the desired accuracy level. Performance of the predictive model may be evaluated in a number of ways based on a number of true positives, false positives, true negatives, and/or false negatives classifications of the plurality of data points indicated by the predictive model. For example, the false positives of the predictive model may refer to the number of times the predictive model incorrectly predicted and/or determined a user-to-function pairing, function type, depicted talent and opportunity scenario, demographic characteristic pairing, and/or the like. Conversely, the false negatives of the predictive model may refer to the number of times the machine learning model predicted and/or determined a user-to-function pairing, function type, depicted talent and opportunity scenario, demographic characteristic pairing, and/or the like incorrectly, when in fact, the predicted and/or determined user-to-function pairing, function type, depicted talent and opportunity scenario, demographic characteristic pairing, and/or the like matches an actual user-to-function pairing, function type, depicted talent and opportunity scenario, demographic characteristic pairing, and/or the like. True negatives and true positives may refer to the number of times the predictive model correctly predicted and/or determined a user-to-function pairing, function type, depicted talent and opportunity scenario, demographic characteristic pairing, and/or the like. Related to these measurements are the concepts of recall and precision. Generally, recall refers to a ratio of true positives to a sum of true positives and false negatives, which quantifies the sensitivity of the predictive model. Similarly, precision refers to a ratio of true positives as a sum of true and false positives.

In 490, talent and opportunity management module 120 outputs the predictive model (and/or an output of the predictive model). For example, talent and opportunity management module 120 may output the predictive model when such a desired accuracy level is reached. An output of the predictive model may end the training phase.

According to some aspects, when the desired accuracy level is not reached, in 490, talent and opportunity management module 120 may perform a subsequent iteration of the training method 400 starting at 410 with variations such as, for example, considering a larger collection of data from user devices, computing devices, a talent and opportunity management application, and/or the like.

Returning to FIG. 1, according to some aspects, the system, apparatus, device, method, computer program product embodiments, and/or combinations and sub-combinations thereof, for talent and opportunity management enables and/or facilitates the exchange of value (e.g., an amount of points, credits, tokens, etc.) from value packages that has been allocated to a user profile for items including, but not limited to products, gift cards, cryptocurrency, non-fungible tokens, services, and/or the like.

Figure 5:
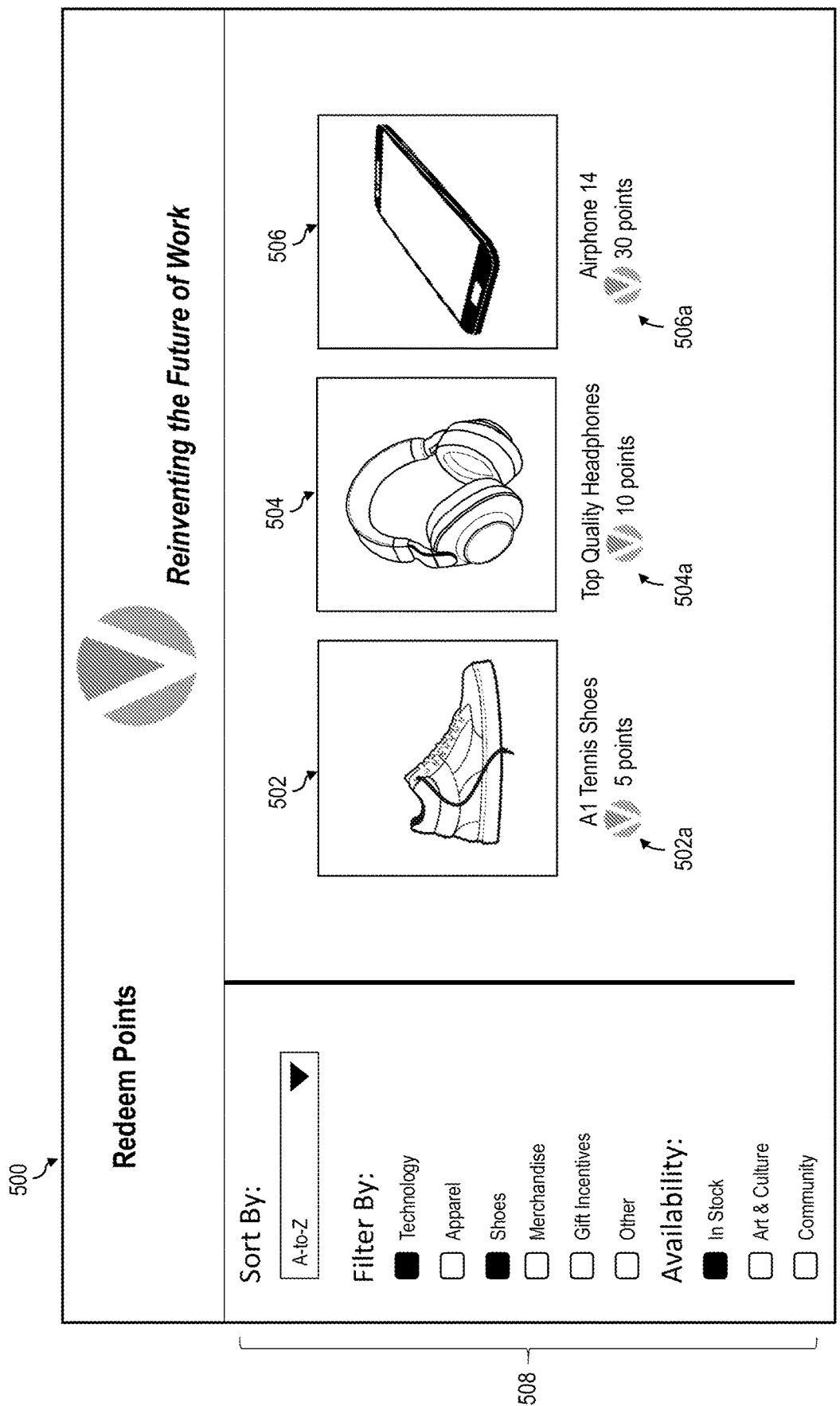
FIG. 5 shows an example of a user interface for talent and opportunity management, according to some aspects.

FIG. 5 shows an example user interface for talent and opportunity management. According to some aspects, user interface 500 may be a different page, screen, instance, and/or the like of the user interface 200 of FIGS. 2A and 2B. According to some aspects, the item indicators 502, 504, and 506 may indicate items available to be received based on a value exchange (e.g., an amount of points, credits, tokens, etc.) from value packages that have been allocated to user profiles. According to some aspects, the item indicators 502, 504, and 506 may be associated with value indicators 502a, 504a, and 506a, respectively. The value indicators 502a, 504a, and 506a may indicate an amount of value that must be exchanged from value packages that have been allocated to user profiles for the items indicated by item indicators 502, 504, and 506 to be received.

According to some aspects, the item indicators 502, 504, and 506 may be displayed responsive to item filtering information received via filter elements 508. The filter elements 508 may be used to identify items based on user-defined criteria. According to some aspects, the item indicators 502, 504, and 506 may be interactive. For example, an interaction with an item indicator (via one or more input devices and/or components, etc.) may select the associated item.

Figure 6:
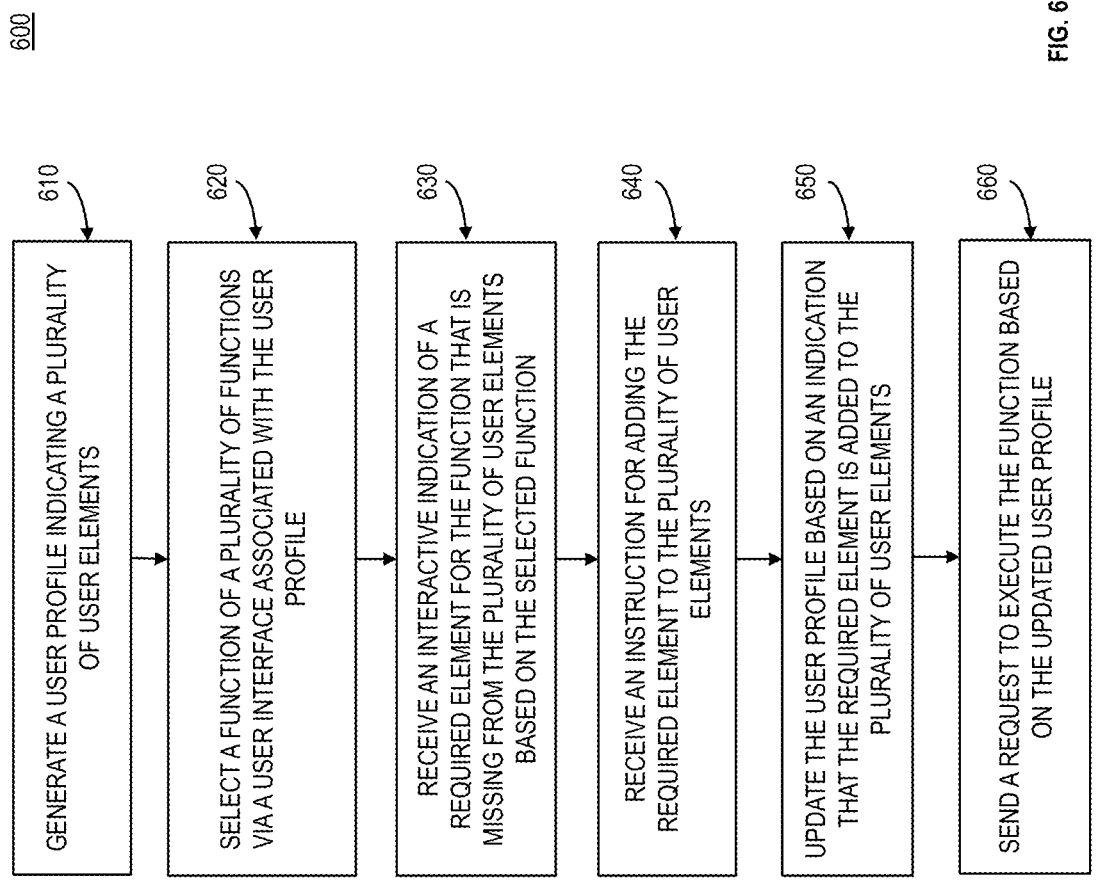
FIG. 6 shows a flowchart of an example method for talent and opportunity management, according to some aspects.

FIG. 6 shows a flowchart of an example method 600 for talent and opportunity management, according to some aspects. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIGS. 1-5. However, method 600 is not limited to the aspects of those figures.

In 610, user device 104 generates a user profile indicating a plurality of user elements. User elements may include, but are not limited to, biographical information associated with a user, examples of projects/work (e.g., digital art, artwork, applications/code, multimedia, etc.) performed by a user, social media information and/or site profile information, employment history information associated with a user, general/personal information associated with a user, skill-related information associated with a user, and/or the like.

In 620, user device 104 selects a function of a plurality of functions. For example, user device 104 may select a function of a plurality of functions via a user interface associated with the user profile and/or displayed by the user device. According to some aspects, the selected function may include a virtual task, a physical task, an assignment, a job, and/or the like.

According to some aspects, the plurality of functions may be displayed via the user interface based on a correspondence between at least one element of the plurality of user elements and at least one function of the plurality of functions.

According to some aspects, the plurality of functions may be displayed via the user interface based on inputting the plurality of user elements into the predictive model and receiving an indication of the plurality of functions from the predictive model in response.

In 630, user device 104 receives an interactive indication of a required element for the function that is missing from the plurality of user elements. For example, the user device 104 may receive the interactive indication of the required element based on selecting the function.

In 640, user device 104 receives an instruction for adding the required element to the plurality of user elements. The instruction may be displayed via the user interface, for example, as a pop-up window and/o the like. The instruction for adding the required element to the plurality of user elements may include instructions for receiving at least one of skills training information or an educational video. For example, a pop-up window may include a link to a training course, multimedia content, a third-party resource, and/or the like.

In 650, user device 104 updates the user profile. The user device 104 may update the user profile based on an indication that the required element is added to the plurality of user elements. For example, access and/or completion of the training course, multimedia content, and/or third-party resource may cause the required element to be added to the plurality of user elements of the user profile.

In 660, user device 104 sends a request to execute the function. For example, the user device 104 may send a request to execute the function based on the updated user profile.

According to some aspects, the method 600 may further include the user device receiving value from a value package associated with the function. For example, the user device may receive value from a value package associated with the function based on an indication that the function is executed. The user device may select, via the user interface associated with the user profile, an item of a plurality of displayed items. The user device (a user of the user device) may receive the selected item. For example, the user device (a user of the user device) may receive the selected item based on a trade of at least a portion of the value. The selected item may include, for example, a product, a gift card, cryptocurrency, a non-fungible token, a service, and/or any item of value.

According to some aspects, the method 600 may further include the user device sending data indicative of at least a portion of the user profile and the indication that the required element is added to the plurality of user elements to a computing device associated with the function.

Figure 7:
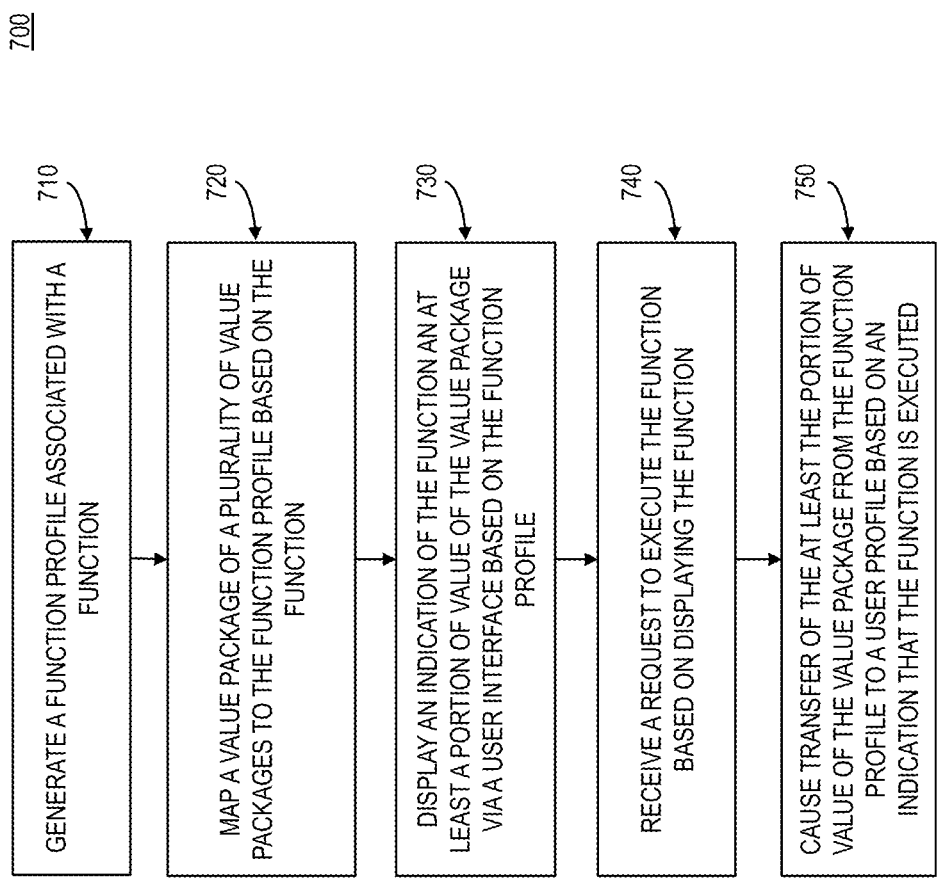
FIG. 7 shows a flowchart of an example method for talent and opportunity management, according to some aspects.

FIG. 7 shows a flowchart of an example method 700 for talent and opportunity management, according to some aspects. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIGS. 1-5. However, method 700 is not limited to the aspects of those figures.

In 710, computing device 110 generates a function profile associated with a function. According to some aspects, the function may include a virtual task, a physical task, an assignment, a job, and/or the like.

In 720, computing device 110 maps a value package of a plurality of value packages to the function profile. For example, the computing device 110 maps a value package of a plurality of value packages to the function profile based on the function. A value package may include, for example, an amount of points, an amount of credits, an amount of tokens, and/or the like. For example, a computing device may be used to sign an entity, an organization, a business, and/or the like up for an account hosted and/or supported by a talent and opportunity management application and/or the like, and purchased points may be associated with the account.

In 730, computing device 110 causes display, via a user interface and based on the function profile, of an indication of the function and at least a portion of the value of the value package. For example, the computing device 110 may be used to post an indication of a function to a page of a talent and opportunity management application and/or the like.

In 740, computing device 110 receives a request to execute the function. For example, the computing device 110 may receive a request to execute the function based on displaying the function. The request to execute the function may be, for example, from the user device 104 (a user of the user device 104 and/or the like.

In 750, computing device 110 causes a transfer of at least a portion of value of the value package from the function profile to a user profile. For example, the computing device 110 may cause a transfer of at least a portion of value of the value package from the function profile to a user profile based on an indication that the function is executed by a user and/or a user device of associated with the user profile.

FIG. 8 is an example computer system useful for implementing various embodiments. Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof. According to some aspects, the user device 104, the computing device 110, and/or the service device 116 of FIG. 1 (and/or any other device/component described herein) may be implemented using the computer system 800. According to some aspects, the computer system 800 may be used to implement method 400 and/or any other methods and/or steps described herein.

Computer system 800 may include one or more processors (also called central processing units, or CPUs), such as a processor 804. Processor 804 may be connected to a communication infrastructure or bus 806.

Computer system 800 may also include user input/output device(s) 802, such as monitors, keyboards, pointing devices, etc., which may communicate with communication infrastructure or bus 806 through user input/output device(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, a tape backup device, and/or any other storage device/drive.

Removable storage drive 814 may interact with a removable storage unit 818. The removable storage unit 818 may include a computer-usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 may read from and/or write to the removable storage unit 818.

Secondary memory 810 may include other means, devices, components, instrumentalities, and/or other approaches for allowing computer programs and/or other instructions and/or data to be accessed by computer system 800. Such means, devices, components, instrumentalities, and/or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   generating a user profile indicating a plurality of user elements;
   displaying, based on the plurality of user elements input to a predictive model, a plurality of functions, wherein the predictive model is trained to output the plurality of functions based on user element-to-function pairings via a training method comprising:
      training the predictive model on an initial data set comprising labeled data indicating at least one candidate user element-to-function pairings,
      generating a set of parameters for predicting user element-to-function pairings based on the training,
      introducing an unlabeled data set for another plurality of user elements into the predictive model, applying the set of parameters to the unlabeled data set, and generating the plurality of functions based on the applied set of parameters;

receiving, via a user interface associated with the user profile, a selection of a function of the plurality of functions;

displaying, based on the selected function, a secondary interactive window within at least a portion of the user interface that comprises an indication of a required element for the function that is missing from the plurality of user elements;

receiving, based on an interaction with the interactive indication of the required element, an instruction for adding the required element to the plurality of user elements;

updating, based on an indication that the required element is added to the plurality of user elements, the user profile;

sending, based on the updated user profile, a request to execute the function; and displaying, based on an indication that the function is executed, an item to exchange for a value of a value package associated with the function.

2. The method of claim 1, wherein the plurality of functions are displayed via the user interface based on a correspondence between at least one element of the plurality of user elements and at least one function of the plurality of functions.

3. The method of claim 1, wherein the function comprises at least one of a virtual task, a physical task, a temporary task, a task to be executed over a period of time, or an assignment, the method further comprising sending, to a computing device associated with the function, data indicative of at least a portion of the user profile and the indication that the required element is added to the plurality of user elements.

4. The method of claim 1, wherein the instruction for adding the required element to the plurality of user elements comprises instructions for receiving at least one of skills training information, skills assessment information, or an educational video.

5. The method of claim 1, wherein the item comprises at least one of a product, a gift card, cryptocurrency, a non-fungible token, or a service.

6. A non-transitory computer-readable medium having instructions stored thereon that, when executed by at least one computing device, causes the at least one computing device to perform operations comprising:

generating a user profile indicating a plurality of user elements;

displaying, based on the plurality of user elements input to a predictive model, a plurality of functions, wherein the predictive model is trained to output the plurality of functions based on user element-to-function pairings via a training method comprising:

training the predictive model on an initial data set comprising labeled data indicating at least one candidate user element-to-function pairing, generating a set of parameters for predicting user element-to-function pairings based on the training, introducing an unlabeled data set for another plurality of user elements into the predictive model, applying the set of parameters to the unlabeled data set, and generating the plurality of functions based on the applied set of parameters;

receiving selecting, via a user interface associated with the user profile, a selection of a function of the plurality of functions;

displaying receiving, based on the selected selecting the function, a secondary interactive window within at least a portion of the user interface that comprises an indication of a required element for the function that is missing from the plurality of user elements;

receiving, based on an interaction with the interactive indication of the required element, an instruction for adding the required element to the plurality of user elements;

updating, based on an indication that the required element is added to the plurality of user elements, the user profile; and sending, based on the updated user profile, a request to execute the function; and displaying, based on an indication that the function is executed, an item to exchange for a value of a value package associated with the function.

7. The non-transitory computer-readable medium of claim 6, wherein the plurality of functions are displayed via the user interface based on a correspondence between at least one element of the plurality of user elements and at least one function of the plurality of functions.

8. The non-transitory computer-readable medium of claim 6, wherein the function comprises at least one of a virtual task, a physical task, a temporary task, a task to be executed over a period of time, or an assignment, the operations further comprising sending, to a computing device associated with the function, data indicative of at least a portion of the user profile and the indication that the required element is added to the plurality of user elements.

9. The non-transitory computer-readable medium of claim 6, wherein the instruction for adding the required element to the plurality of user elements comprises instructions for receiving at least one of skills training information, skills assessment information, or an educational video.

10. The non-transitory computer-readable medium of claim 6, wherein the item comprises at least one of a product, a gift card, cryptocurrency, a non-fungible token, or a service.

11. A system comprising:

a memory; and at least one processor coupled to the memory and configured to perform operations comprising:

generating a user profile indicating a plurality of user elements;

displaying, based on the plurality of user elements input to a predictive model, a plurality of functions, wherein the predictive model is trained to output the plurality of functions based on user element-to-function pairings via a training method comprising:

training the predictive model on an initial data set comprising labeled data indicating at least one candidate user element-to-function pairing, generating a set of parameters for predicting user element-to-function pairings based on the training, introducing an unlabeled data set for another plurality of user elements into the predictive model, applying the set of parameters to the unlabeled data set, and generating the plurality of functions based on the applied set of parameters;

receiving selecting, via a user interface associated with the user profile, a selection of a function of the plurality of functions;

displaying receiving, based on the selected selecting the function, a secondary interactive window within at least a portion of the user interface that comprises an indication of a required element for the function that is missing from the plurality of user elements;

receiving, based on an interaction with the interactive indication of the required element, an instruction for adding the required element to the plurality of user elements;

updating, based on an indication that the required element is added to the plurality of user elements, the user profile; and sending, based on the updated user profile, a request to execute the function; and displaying, based on an indication that the function is executed, an item to exchange for a value of a value package associated with the function.

12. The system of claim 11, wherein the plurality of functions are displayed via the user interface based on a correspondence between at least one element of the plurality of user elements and at least one function of the plurality of functions.

13. The system of claim 11, wherein the function comprises at least one of a virtual task, a physical task, a temporary task, a task to be executed over a period of time, or an assignment, the operations further comprising sending, to a computing device associated with the function, data indicative of at least a portion of the user profile and the indication that the required element is added to the plurality of user elements.

14. The system of claim 11, wherein the instruction for adding the required element to the plurality of user elements comprises instructions for receiving at least one of skills training information, skills assessment information, or an educational video.

15. The system of claim 11, wherein the item comprises at least one of a product, a gift card, cryptocurrency, a non-fungible token, or a service.

* * * * *